US008814128B2

(12) United States Patent
Trinh et al.

(10) Patent No.: US 8,814,128 B2
(45) Date of Patent: Aug. 26, 2014

(54) DISPLAY SYSTEM FOR MOBILE ELECTRONIC DEVICES AND ASSOCIATED METHODS

(71) Applicant: Target Brands, Inc., Minneapolis, MN (US)

(72) Inventors: Nick Q. Trinh, Minneapolis, MN (US); Joseph H. Bowser, Minneapolis, MN (US); Justin T. Werth, Nowthen, MN (US)

(73) Assignee: Target Brands, Inc., Minneapolis, MN (US)

(*) Notice: Subject to any disclaimer, the term of this patent is extended or adjusted under 35 U.S.C. 154(b) by 112 days.

(21) Appl. No.: 13/631,348

(22) Filed: Sep. 28, 2012

(65) Prior Publication Data

US 2014/0092531 A1 Apr. 3, 2014

(51) Int. Cl.
*F16M 13/00* (2006.01)
(52) U.S. Cl.
USPC ...... 248/551; 248/682; 248/187.1; 340/568.2
(58) Field of Classification Search
CPC ..... F01M 11/041; F01M 13/00; F01M 11/04; A47F 7/024; A47F 5/0846; E05B 73/0082
USPC ................ 248/682, 689, 551, 553, 488, 158, 248/187.1, 177.1, 346.03; 348/568.8, 348/568.1, 568.2, 568.3, 568.4; 361/679.55; 340/568.8, 568.1, 568.2, 340/568.3, 568.4
See application file for complete search history.

(56) References Cited

U.S. PATENT DOCUMENTS

| 1,701,419 | A | * | 2/1929 | Peden ........................ 248/488 |
|---|---|---|---|---|
| 5,076,079 | A | | 12/1991 | Monoson et al. |
| 5,583,742 | A | | 12/1996 | Noda et al. |
| 5,586,002 | A | | 12/1996 | Notarianni |
| 5,595,074 | A | | 1/1997 | Munro |
| 5,836,183 | A | | 11/1998 | Derman |
| 6,216,499 | B1 | | 4/2001 | Ronberg et al. |
| 6,237,375 | B1 | | 5/2001 | Wymer |
| 6,308,928 | B1 | | 10/2001 | Galant |
| 6,443,417 | B2 | | 9/2002 | Galant |
| 6,700,488 | B1 | | 3/2004 | Leyden et al. |
| 6,763,690 | B2 | | 7/2004 | Galant |

(Continued)

OTHER PUBLICATIONS

U.S. Appl. No. 29/433,411, filed Sep. 28, 2012 (15 pages).

(Continued)

*Primary Examiner* — Bradley Duckworth
(74) *Attorney, Agent, or Firm* — Griffiths & Seaton PLLC; JoAnn M. Seaton

(57) ABSTRACT

A display fixture for securely displaying a mobile device includes a cross brace and at least two corner members. The cross brace defines a center portion and arms each radially extending outwardly therefrom and terminating in a free end opposite the center portion. The at least two corner members each include a first substantially planar wall, a second substantially planar wall, and two sidewalls extending between substantially linear closed edges of the first substantially planar wall and the second substantially planar wall. A cavity is defined by each of the at least two corner members and is configured to receive a corner of the mobile device. Each of the at least two corner members is secured to a different free end of the cross brace such that an opening to the cavity of each of the at least two corner members faces the center portion of the cross brace.

23 Claims, 12 Drawing Sheets

(56) References Cited

U.S. PATENT DOCUMENTS

| | | | |
|---|---|---|---|
| 7,007,912 B1 | 3/2006 | Giuliani et al. | |
| 7,031,148 B1 | 4/2006 | Lin | |
| 7,032,872 B2 | 4/2006 | Sullivan | |
| 7,174,752 B2 | 2/2007 | Galant | |
| 7,187,283 B2* | 3/2007 | Leyden et al. | 340/568.1 |
| D540,566 S | 4/2007 | Scholen et al. | |
| 7,274,564 B2 | 9/2007 | Rossini | |
| 7,287,652 B2 | 10/2007 | Scholen et al. | |
| D564,220 S | 3/2008 | Dixon | |
| 7,443,665 B2 | 10/2008 | Allen | |
| 7,495,895 B2 | 2/2009 | Carnevali | |
| 7,499,270 B2 | 3/2009 | Allen | |
| 7,522,047 B2 | 4/2009 | Belden, Jr. et al. | |
| 7,611,119 B2 | 11/2009 | Rossini | |
| 7,614,601 B2 | 11/2009 | Marsilio et al. | |
| 7,626,500 B2 | 12/2009 | Belden, Jr. et al. | |
| 7,654,399 B2 | 2/2010 | Scholen et al. | |
| 7,658,363 B2 | 2/2010 | Meyer | |
| 7,710,266 B2 | 5/2010 | Belden, Jr. et al. | |
| 7,740,214 B2 | 6/2010 | Marsilio et al. | |
| 7,744,404 B1 | 6/2010 | Henson et al. | |
| 7,866,623 B2 | 1/2011 | Lampman et al. | |
| D634,315 S | 3/2011 | Nousiainen | |
| 7,909,641 B1 | 3/2011 | Henson et al. | |
| D637,593 S | 5/2011 | Zanetti | |
| D640,707 S | 6/2011 | Yeh | |
| D641,610 S | 7/2011 | Sedalo | |
| 7,971,845 B2 | 7/2011 | Galant | |
| D653,668 S | 2/2012 | Song et al. | |
| D658,651 S | 5/2012 | Lee et al. | |
| D666,205 S | 8/2012 | Li et al. | |
| 8,235,334 B1* | 8/2012 | Kobal | 248/122.1 |
| D669,481 S | 10/2012 | Prescott et al. | |
| D669,890 S | 10/2012 | Hopkins et al. | |
| D673,960 S | 1/2013 | Lindfield et al. | |
| D674,803 S | 1/2013 | Westrup | |
| D674,804 S | 1/2013 | Cote | |
| 8,360,373 B2* | 1/2013 | Johnson et al. | 248/161 |
| 8,413,943 B1* | 4/2013 | Li | 248/454 |
| 8,523,122 B2* | 9/2013 | Johnson et al. | 248/161 |
| 2002/0101411 A1 | 8/2002 | Chang | |
| 2005/0161555 A1 | 7/2005 | Leitner et al. | |
| 2005/0206521 A1* | 9/2005 | Frederiksen | 340/568.2 |
| 2008/0192410 A1 | 8/2008 | Kumar | |
| 2009/0079566 A1 | 3/2009 | Goldstein et al. | |
| 2009/0166483 A1 | 7/2009 | Marsilio et al. | |
| 2009/0173868 A1 | 7/2009 | Fawcett et al. | |
| 2010/0060532 A1 | 3/2010 | Kuang et al. | |
| 2010/0078343 A1 | 4/2010 | Hoellwarth et al. | |
| 2010/0079285 A1 | 4/2010 | Fawcett et al. | |
| 2010/0108828 A1* | 5/2010 | Yu et al. | 248/123.11 |
| 2010/0133209 A1 | 6/2010 | Scholen et al. | |
| 2010/0326144 A1 | 12/2010 | Foster et al. | |
| 2011/0024371 A1 | 2/2011 | Lampman et al. | |
| 2011/0042331 A1 | 2/2011 | Johnson et al. | |
| 2011/0062294 A1 | 3/2011 | Johnson et al. | |
| 2011/0084838 A1 | 4/2011 | Fawcett | |
| 2011/0100073 A1 | 5/2011 | Johnston et al. | |
| 2011/0133050 A1 | 6/2011 | Eisenberger, Sr. et al. | |
| 2011/0240830 A1* | 10/2011 | Alemozafar et al. | 248/689 |
| 2012/0037783 A1* | 2/2012 | Alexander et al. | 248/551 |
| 2012/0043234 A1 | 2/2012 | Westrup | |
| 2012/0075789 A1* | 3/2012 | DeCamp et al. | 361/679.26 |
| 2012/0080577 A1* | 4/2012 | McIntyre et al. | 248/346.04 |
| 2013/0105662 A1* | 5/2013 | Cote | 248/689 |

OTHER PUBLICATIONS

Notice of Allowance for U.S. Appl. No. 29/433,411, mailed May 9, 2013 (6 pages).
"Tablet and Smartphone Merchandising Security & Power," printed from http://mti-interactive.com/categories-supported/?filter=term-15, 2012 (5 pages).
"Expandable Laptop Security Bracket," printed from www.americantheftprevention.com/Computer-Laptop-Security/ Expandable-Laptop-Bracket-p178.html on May 14, 2012 (2 pages).
"MTI's Tether Technologies Improve Durability, Reduce False Alarms, and Extend Display Lifespan Over 4 Times That of Retractor-Based Systems," www.mti-interactive.com, publicly available more than one year prior to May 14, 2012 (9 pages).
"Freedom™ Core," www.mti-interactive.com, publicly available more than one year prior to May 14, 2012 (8 pages).
U.S. Appl. No. 13/471,156, filed May 14, 2012 (73 pages).
Photographs of Amazon Kindle® Display publicly available more than one year prior to Sep. 28, 2012 (2 pages).
Office Action from Canadian Patent Application No. 2,791,297, mailed Aug. 5, 2013 (2 pages).

* cited by examiner

DISPLAY SYSTEM FOR MOBILE ELECTRONIC DEVICES AND ASSOCIATED METHODS

BACKGROUND OF THE INVENTION

Display fixtures are often used in retail stores or other environments as part of a display system to present various products to consumers. For example, electronic devices can be displayed in stores to draw the interest of potential consumers. The display fixtures provide consumers with the opportunity to handle or use a number of sample or representative devices before purchasing an electronic device in a factory or otherwise sealed package.

Some display fixtures are specifically designed to provide consumer access to a number of digital cameras, mobile phones, e-readers or other electronic devices. The sample electronic devices are retained by the fixture and arranged so that consumers can handle the device and inspect the user interface. Sample electronic devices can be selectively lifted from a display fixture so that consumers can handle and explore features of the devices. A security tether cable may be connected between each of the electronic devices and the display fixture so as to deter theft. If a sample electronic device is moved beyond a predetermined distance from the display fixture, the security tether cable can activate an audible alarm to alert store workers. The audible alarm may continue until a store worker arrives at the display fixture to deactivate the alarm.

SUMMARY OF THE INVENTION

One aspect of the present invention relates to a display fixture for securely displaying a mobile electronic device in a retail setting. The display fixture includes a cross brace and at least two corner members. The cross brace defines a center portion and includes at least three arms radially extending outwardly from the center portion. Each of the at least three arms terminates in a free end opposite the center portion. The at least two corner members each include a first substantially planar wall, a second substantially planar wall extending substantially parallel to the first substantially planar wall, and two sidewalls extending between substantially linear closed edges of the first substantially planar wall and the second substantially planar wall. A cavity is defined by each of the at least two corner members between the first substantially planar wall and the second substantially planar wall with each cavity being configured to receive a corner of the mobile electronic device. Each of the at least two corner members defines an opening to access the cavity of each of the at least two corner members opposite the two sidewalls. The second substantially planar wall of each of the at least two corner members is secured to a different free end of the cross brace such that the opening of each of the at least two corner members faces the center portion of the cross brace. Other apparatus, assemblies, and associated methods are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention merely provides example embodiments and is not intended to limit the invention or the application and uses of the invention. Furthermore, there is no intention to be bound by any theory presented in the preceding background of the invention or the following detailed description of the invention.

Retail sale of mobile and other electronic devices is an extremely competitive industry. To increase retail sales of mobile electronic devices in a given retail environment, such as a retail store, it is desirable to display mobile electronic devices in an aesthetically pleasing and secure manner while still allowing a potential consumer to relatively freely interact with the mobile electronic devices for their use in inspecting and selecting a desired computing device unit. In one example, a retaining fixture is used for each mobile electronic device and is formed of a cross brace and corner members to securely maintain the mobile electronic device. For instance, different sized cross members are provided and selected of a size to match a particular mobile electronic device, while the corner members are substantially identical for all sizes of mobile electronic devices. By having corner members that can be used to retain multiple sizes of mobile electronic devices, the total number of part types that must be inventoried is decreased. In one embodiment, the display fixtures described herein securely hold the corresponding mobile electronic devices while leaving substantial portions of the edges of the corresponding mobile electronic devices exposed such that a potential consumer can readily get a feel for a thickness, finish, size, etc. of the corresponding computing device and/or interaction with the various control buttons and/or display panel of the corresponding mobile electronic devices without need to remove the mobile electronic devices from their corresponding display fixtures.

Figure 1:
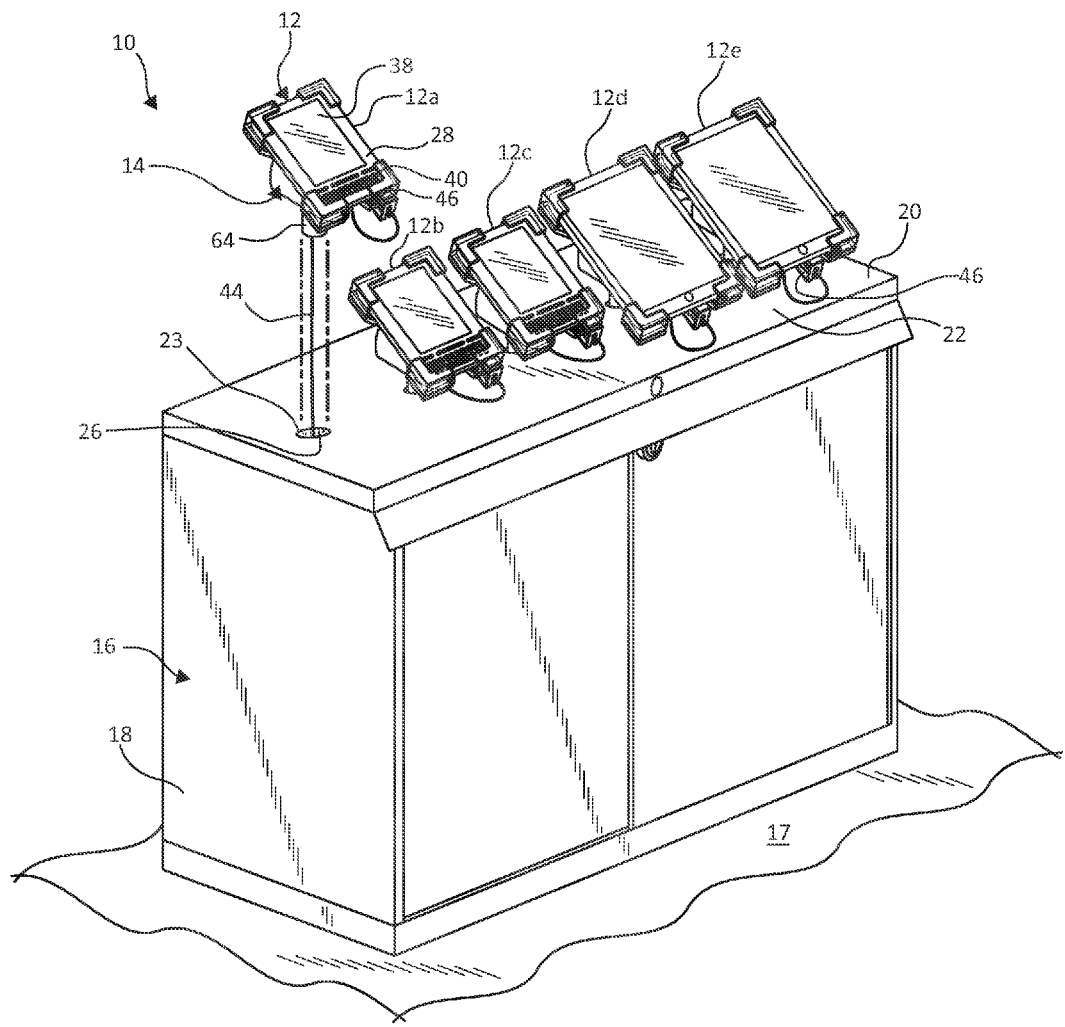
FIG. 1 is a partially exploded, front perspective view illustration of a display system, according to one embodiment of the present invention.
Figure 12:
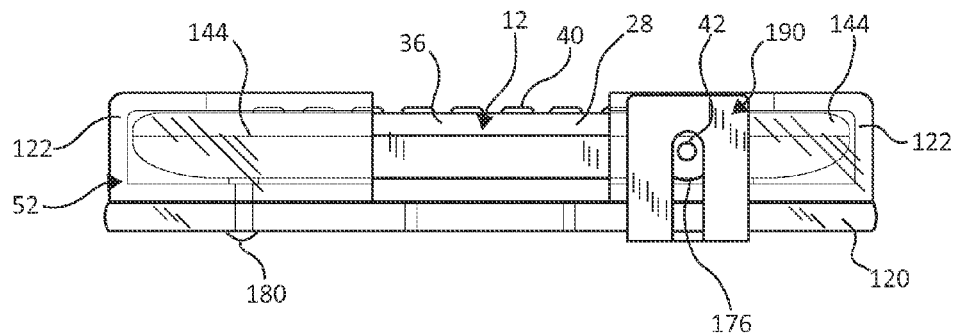
FIG. 12 is an inverted rear view illustration of the retaining assembly and the electronic device of FIG. 5, according to one embodiment of the present invention.

Turning to the figures, one embodiment of a display system 10 is illustrated in FIG. 1 and includes one or more mounting or display fixtures 14 extending from a base unit 16 configured to support various types of computing devices such as, for instance, e-readers, mobile phones, or other mobile electronic devices 12 (as used throughout this application, the term "mobile electronic devices" is used to refer to all handheld electronic devices). In one example, such as where mobile electronic devices 12 are each a different model of an e-reader, each mobile electronic device 12 has a generally rectangularly shaped exterior housing 28 defining a top surface 30, a bottom surface 32, longitudinal edges 34, and lateral edges 36. Longitudinal edges 34 each extend substantially parallel to one another between top surface 30 and bottom surface 32, and lateral edges 36 each extend substantially parallel to one another and, for example, substantially perpendicularly to longitudinal edges 34. Top surface 30 defines a display screen 38 as will be apparent to those of skill in the art reading this application. In one example, mobile electronic device 12 further defines one or more interface buttons 40 and a power port 42 (see FIGS. 12 and 13).

In one embodiment, display system 10 includes a plurality of mobile electronic devices 12 including, for example, mobile electronic devices 12a, 12b, 12c, 12d, and 12e that are each a different brand, model, and/or size such that the corresponding display fixture 14 for each of the plurality of mobile electronic devices 12 is formed with an appropriate size. In this manner, display system 10 showcases a plurality of different mobile electronic devices 12 for a consumer to consider when making a purchase or otherwise learning more about such devices.

Base unit 16 is a display unit extending upwardly from a floor 17 in retail environment and includes a primary structure 18 and a top 20. In one embodiment, top 20 is hinged and configured to rotatably open and close to provide access to an inside of base unit 16, to cover electrical outlets for serving mobile electronic devices 12 with electricity, etc. One example of base unit 16 can be found in commonly assigned U.S. patent application Ser. No. 12/561,458, filed Sep. 17, 2009, which is hereby incorporated by reference. In one embodiment, top 20 defines a top display surface 22 and a plurality of apertures 24 leading to mounting tubes or sleeves 26 in base unit 16. Each mounting sleeve 26 is formed as a hollow tube with an internal cavity (not shown) and is configured to securely receive a lower portion of a respective one of display fixtures 14. More particularly, in one embodiment, each display fixture 14 includes a trunk or mounting post 64 that is selectively received in a corresponding one of mounting sleeves 26, as will be further described below, and a power cord 44 (FIGS. 1 and 2) and any other cords from corresponding ones of the mobile electronic devices 12 can be run through the internal cavity of mounting sleeves 26 to access a power source (not shown) in base unit 16. In one embodiment, power cord 44 is a Universal Serial Bus (USB) connecting cable or other power and/or data connecting cable that is generally provided or otherwise offered for sale for use with mobile electronic device 12 by end user and includes a first end plug 46 at a first end of power cord 44 and a second end plug 48 at an opposing end of power cord 44. In one embodiment, one or more of first and second plugs 46 and 48 are USB plugs.

Figure 2:
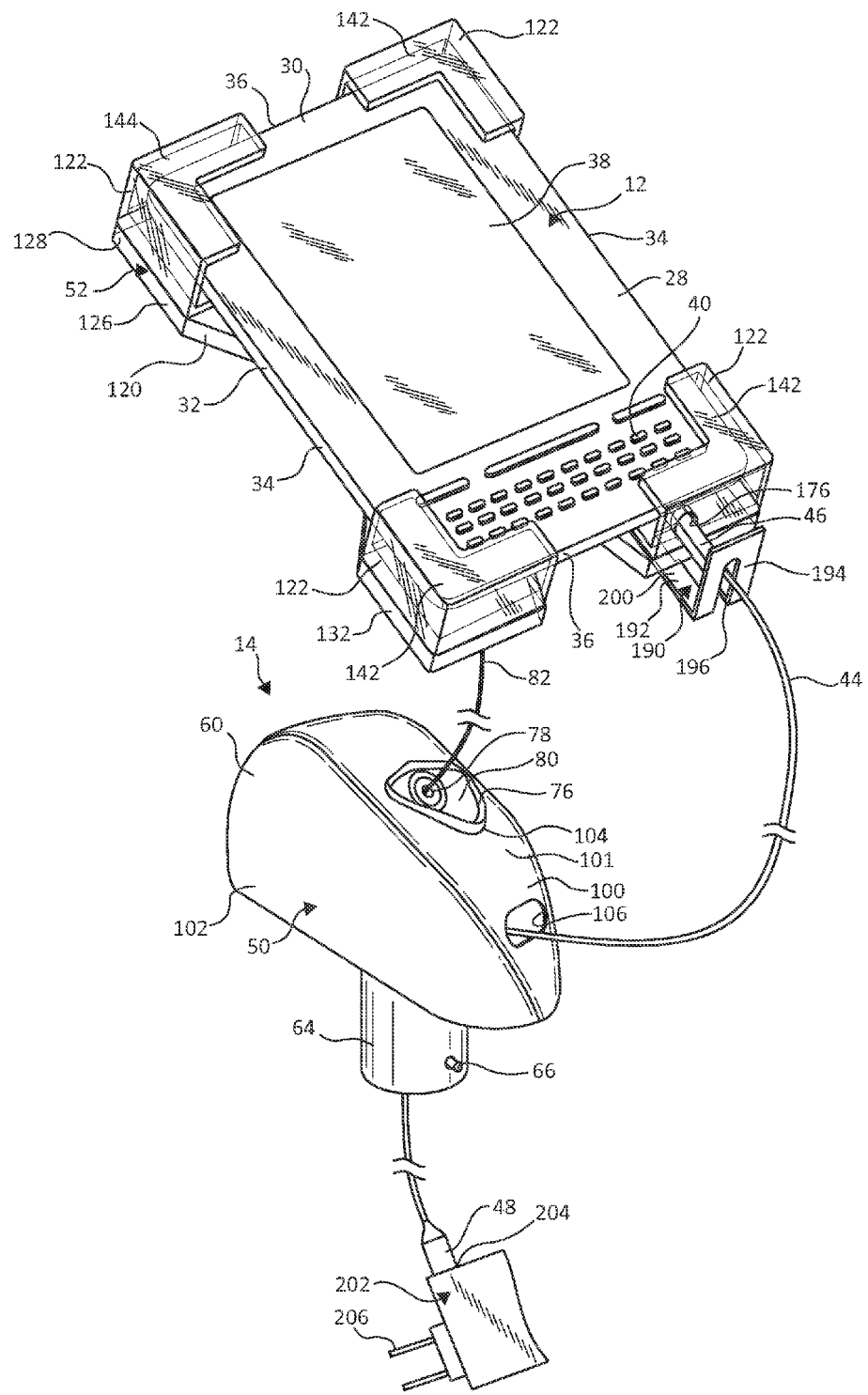
FIG. 2 is a front perspective view illustration of a mobile electronic device and a display fixture used in the display system of FIG. 1, according to one embodiment of the present invention.

FIG. 2 illustrates a mobile electronic device 12 maintained by a display fixture 14, with base unit 16 removed for illustrative purposes, according to one embodiment of the present invention. Display fixture 14 includes trunk assembly 50 and a device retaining assembly 52. In one embodiment, described with additional reference to FIG. 3, trunk assembly 50 includes a trunk or mounting post 64 with a cross support 68 extending across a top end thereof. Mounting post 64 is a hollow cylinder or otherwise shaped hollow extension member sized to be slideably and snugly received within mounting sleeve 26 of base unit 16 (FIG. 1). In one example, mounting post 64 includes a biased pin 66 near a lower edge thereof to facilitate coupling mounting post 64 with base unit 16.

Cross support 68 extends at least partially in a lateral direction over a top end of mounting post 64. In one embodiment, cross support 68 houses a retractable cable assembly or wheel (not shown) configured to selectively receive and release lengths of a retractable cable 82. More particularly, in one embodiment, cross support 68 includes a top surface 70, a front wall 72, and opposing sidewalls 74 formed of sheet metal or other suitable material. Front wall 72 is positioned directly adjacent mounting post 64, and top surface 70 extends rearwardly and angled upwardly (i.e., away from mounting post 64) from a top of front wall 72. Sidewalls 74 extend downwardly from each opposing side of top surface 70 downwardly over a top portion of mounting post 63 and extending behind mounting post 63 to maintain retractable cable assembly substantially hidden behind mounting post 63 and between top surface 70 and sidewalls 74. In one embodiment, front wall 72 defines an opening 92, which aligns with a similar opening (not shown) in or is otherwise placed in communication with a cavity (not shown) in hollow mounting post 63 in a manner providing access to the cavity in hollow mounting post 63.

Cross support 68 includes a protruding portion 76, for example, in a closed loop configuration, near a center of top wall 70 and extending upwardly from top wall 70. Within the confines of protruding portion 76, a cable aperture 78 is formed providing a passageway for retractable cable 82 to extend to the cable storage wheel housed within cross support 68. In one example, a first end (not shown) of retractable cable 82 is secured to the cable storage wheel, and retractable cable 82 extends therefrom and out cable aperture 78 to a second end 86 opposite the first end. A coupling puck 88 is secured to second end 86 and defines a substantially planar surface 84 opposite retractable cable 82. In one example, an indentation or recess 80 is formed around cable aperture 78 and within the confines of the closed loop of protruding portion 76, for instance, to receive coupling puck 88, which is more fully described below, in a nesting or embedded manner. In one example, planar portions of top surface 70 extend both in front of and behind protruding portion 76 and include or are configured to receive one or more suitable fasteners 90 for coupling puck 88 to retaining assembly 52.

Cladding 60 is configured to cover support unit 58 and provide an aesthetically pleasing outside appearance to the assembly. In one embodiment, cladding 60 is injection molded, thermally formed, or otherwise formed of a suitable plastic or other material. As illustrated, in one example, cladding 60 defines a top surface 100 and sidewall 102. Top surface 100 provides a substantially planar reception area 101 for receiving retaining assembly 52 and defines a top opening 104 for receiving protruding portion 76 of support unit 58. More particularly, an outer perimeter of top opening 104 is shaped substantially identically to and slightly larger than an outer perimeter of protruding portion 76 to allow protruding portion 76 to extend through cladding 60 when cladding 60 is secured to support unit 58.

Figure 3:
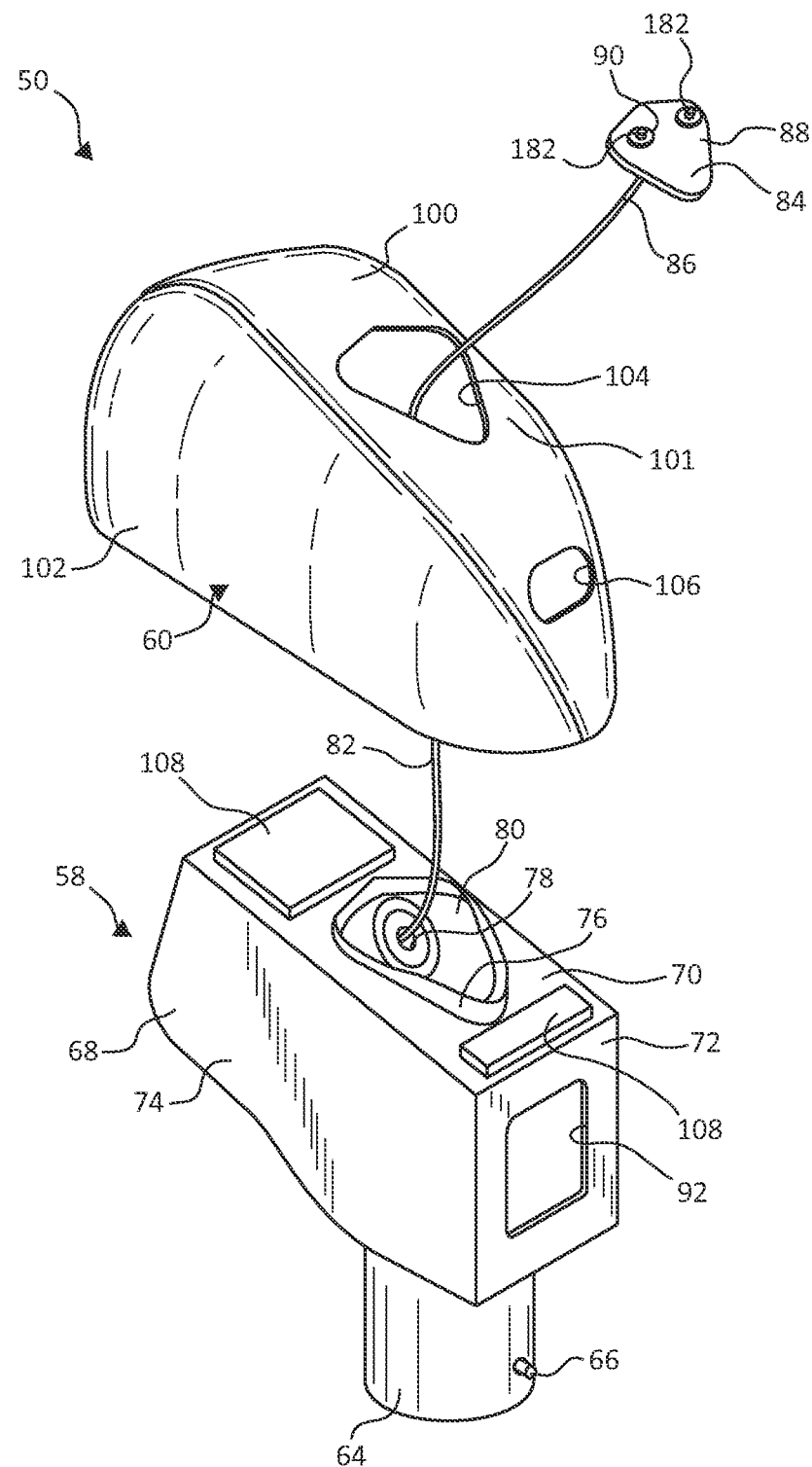
FIG. 3 is an exploded, perspective view illustration of a trunk assembly of the display fixture of FIG. 2 in a first configuration, according to one embodiment of the present invention.
Figure 4:
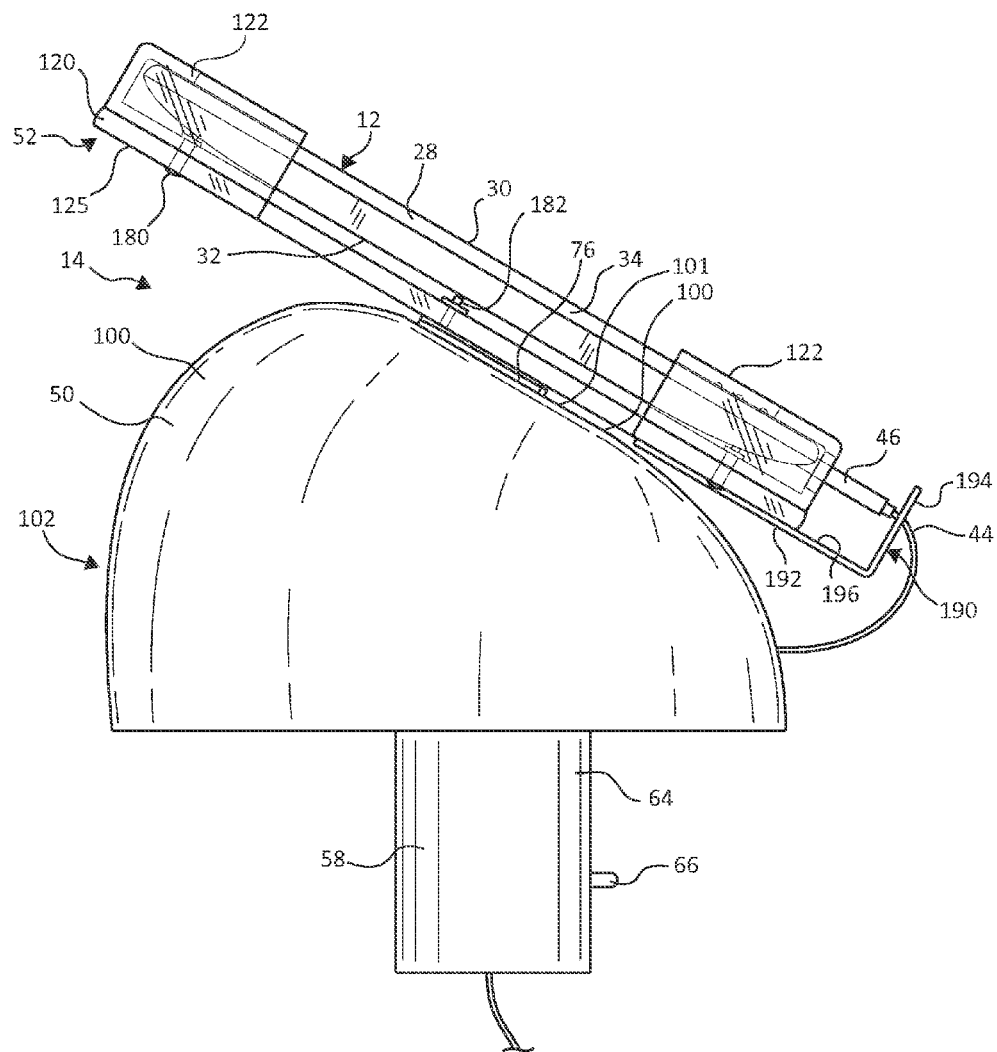
FIG. 4 is a left side illustration of a portion of the display system including an electronic device and a display fixture used in the display system of FIG. 1, according to one embodiment of the present invention.
Figure 5:
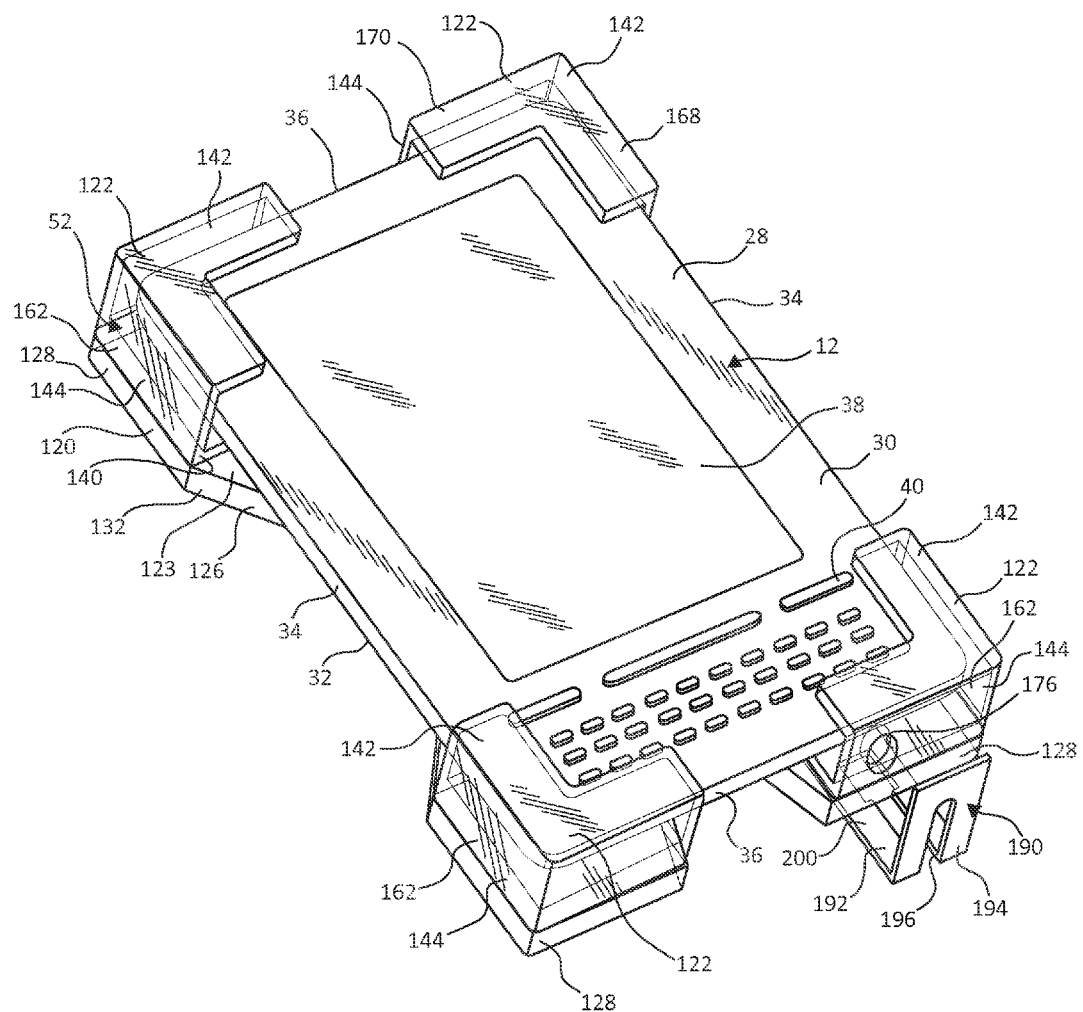
FIG. 5 is a top, front perspective view illustration of a retaining assembly and a mobile electronic device of the display fixture of FIG. 2, according to one embodiment of the present invention.
Figure 6:
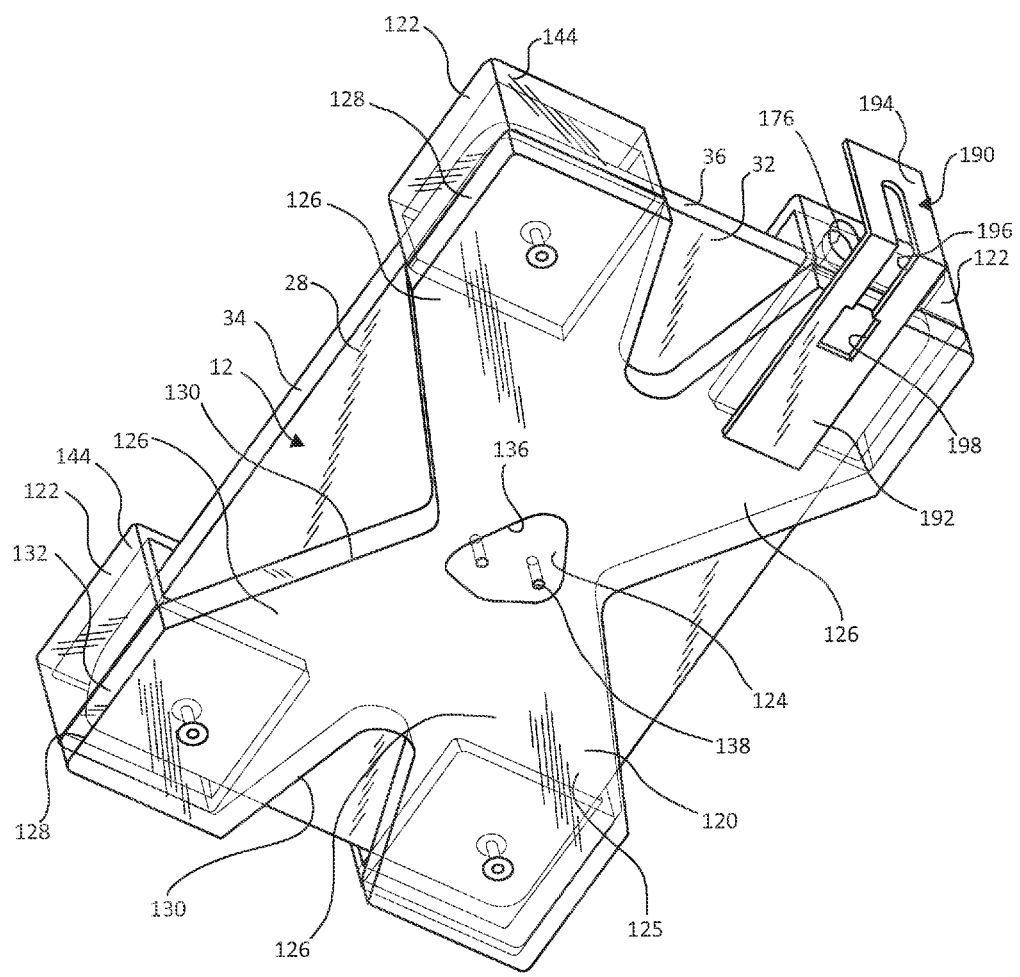
FIG. 6 is a bottom, front perspective view illustration of the retaining assembly and the mobile electronic device of FIG. 5, according to one embodiment of the present invention.
Figure 7:
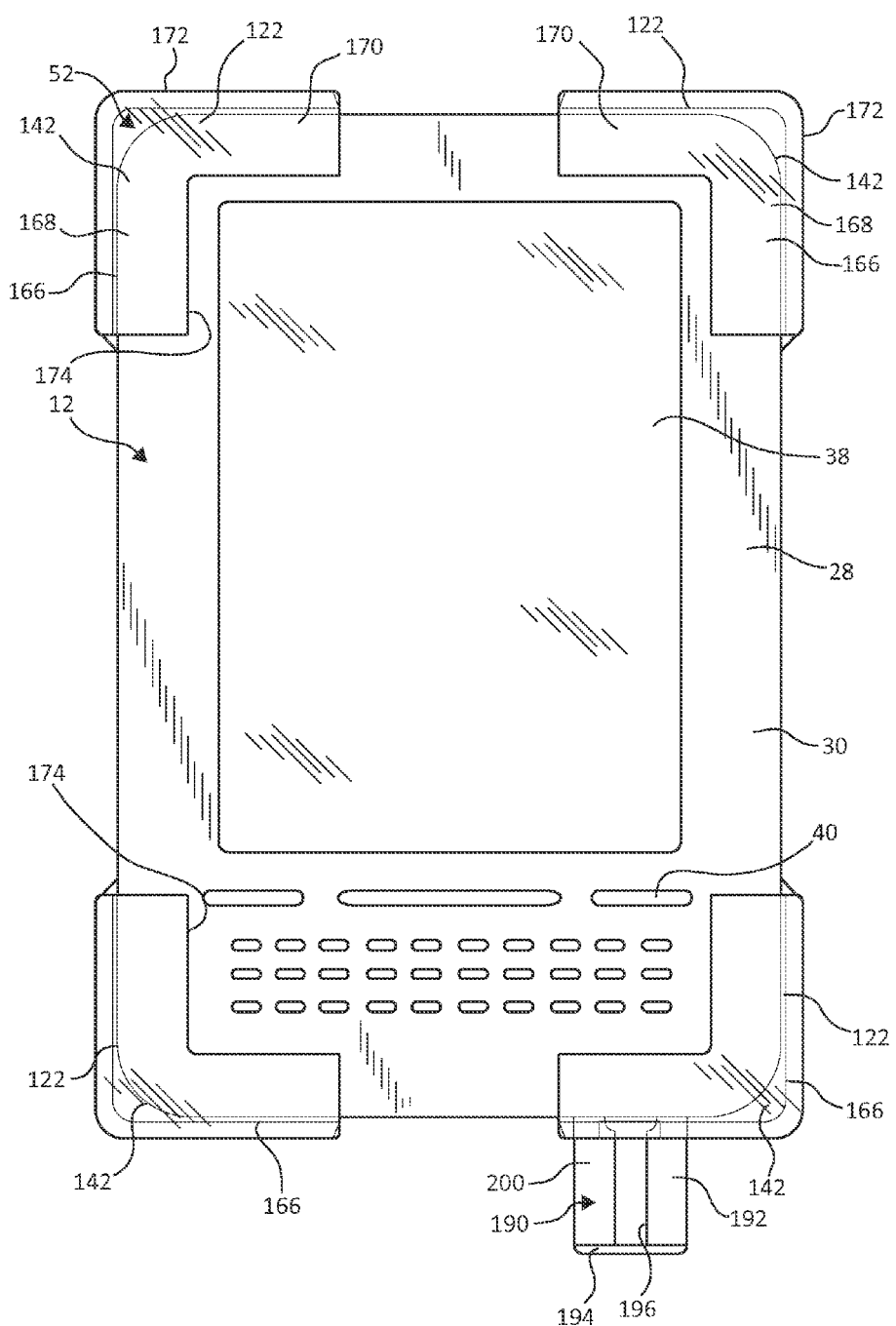
FIG. 7 is a top view illustration of the retaining assembly and the mobile electronic device of FIG. 5, according to one embodiment of the present invention.
Figure 8:
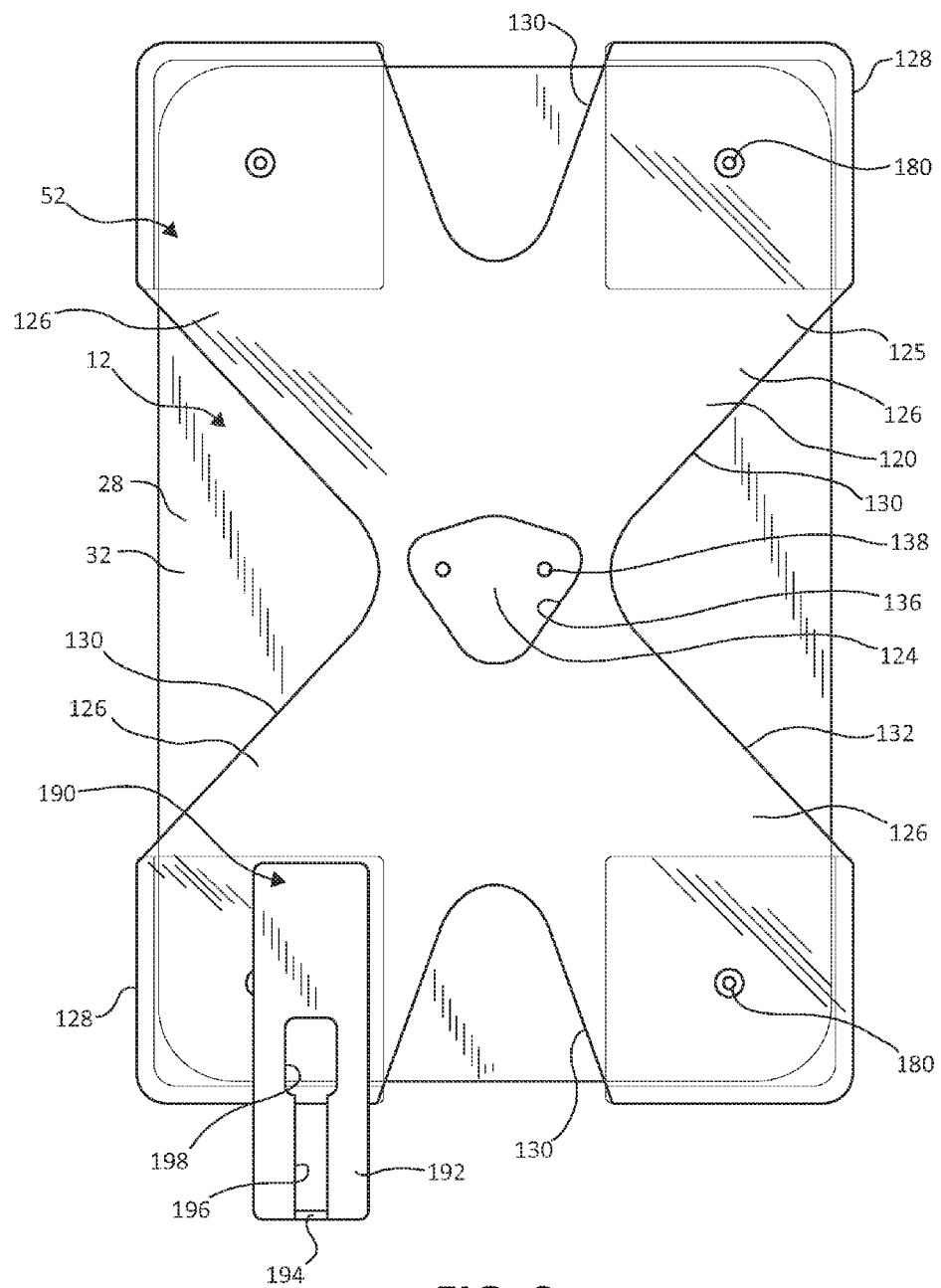
FIG. 8 is a bottom view illustration of the retaining assembly and the mobile electronic device of FIG. 5, according to one embodiment of the present invention.
Figure 9:
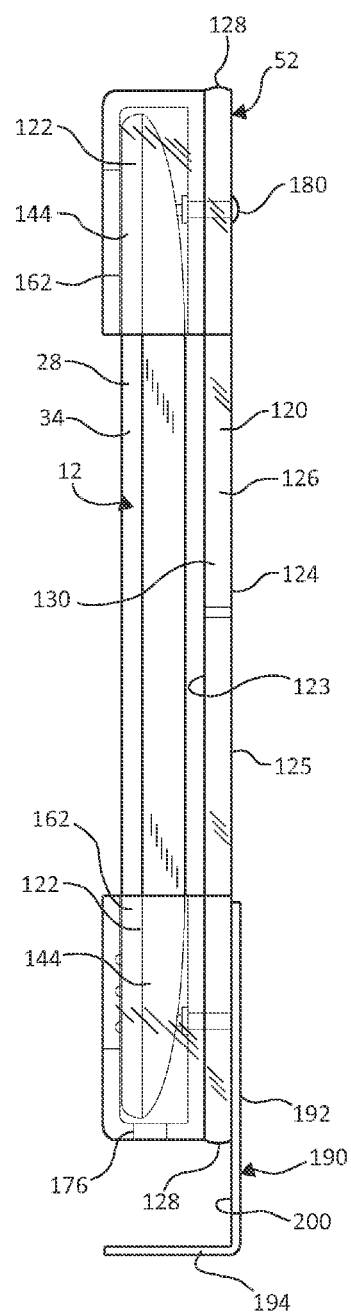
FIG. 9 is a right side view illustration of the retaining assembly and the mobile electronic device of FIG. 5, according to one embodiment of the present invention.
Figure 10:
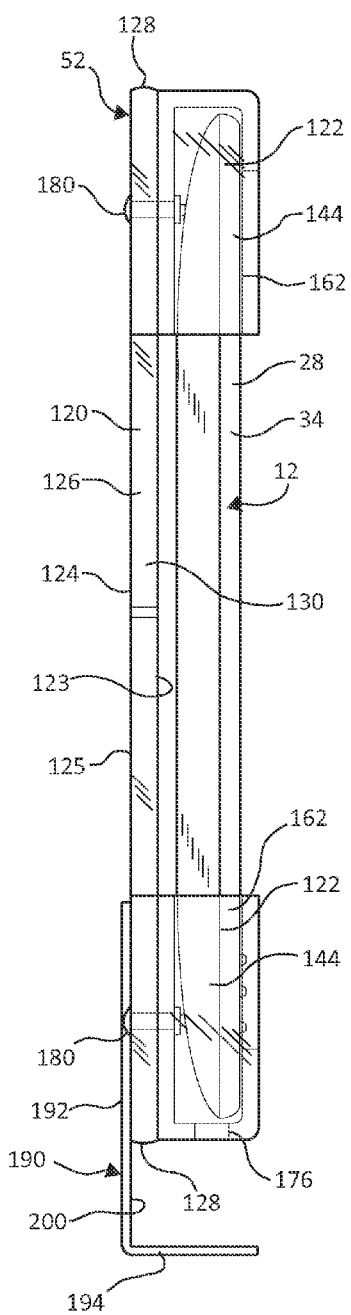
FIG. 10 is a left side view illustration of the retaining assembly and the mobile electronic device of FIG. 5, according to one embodiment of the present invention.
Figure 11:
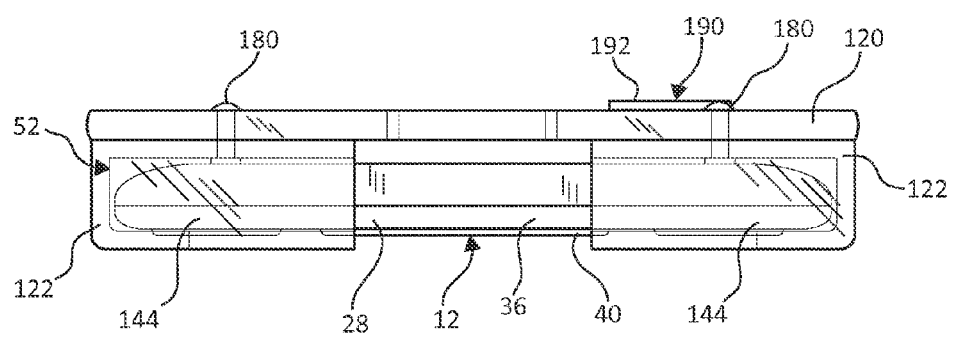
FIG. 11 is front view illustration of the retaining assembly and the mobile electronic device of FIG. 5, according to one embodiment of the present invention.

Sidewall 102 extends from top surface 100 downwardly to a lower edge 110 to form a cavity 112 within cladding 60 for receiving support unit 58. In one example, a front opening 106 is formed in top surface 100 or sidewall 102 and is positioned to align with front opening 92 of support unit 58. Referring to FIGS. 3 and 4, cladding 60 is placed over support unit 58 in a manner placing protruding portion 76 of support unit 58 through top opening 104 and covering a substantial entirety of a remainder of support unit 58 that extends above top display surface 22 of base unit 16. In one example, lower edge 110 is configured to contact or nearly contact top display surface 22 of base unit 16 (FIG. 1) when display system 10 is fully assembled. In one embodiment, padded or other adhesive members 108 are applied to top surface 70 of support unit 58 and contact an internal surface (not shown) of cladding 60 to secure cladding 60 to support unit 58. Other suitable methods of securing support unit 58 and cladding 60 to one another are also contemplated.

FIGS. 5-13 illustrate retaining assembly 52 with mobile electronic device 12, according to one embodiment of the present invention. In one example, retaining assembly 52 includes a cross brace 120 and corner members 122 each formed of a substantially transparent material, for example, each being injection molded or thermally formed of a plastic, acrylic, or other suitable material. In one embodiment, cross brace 120 is generally formed as an X-shaped planar member defining a first or top surface 123 and a second or bottom surface 125 opposite top surface 121. Cross brace 120 generally defines a center portion 124 with at least three, for example, four extensions or arms 126 extending radially outwardly from center portion 124 where each arm 126 extends with an obtuse angle relative to one adjacent arm 126 and with an acute angle relative to the other adjacent arm 126. Each arm 126 defines a free end 128 opposite center portion 124. Each free end 128 terminates in a corner point 127 defined at an intersection between two linear edge segments 129 of arms 126. Cutouts 130 are defined between arms 126 such that cross brace 120 is shaped substantially as an "X." All linear edge segments 129 and cutouts 130 collectively define a perimeter edge 132 of cross brace 120. In one embodiment, cross brace 120 is provided in a plurality of sizes each corresponding with a size of one model of mobile electronic device 12, as will be further described below.

Corner members 122 are each formed to receive a corner of a corresponding mobile electronic device 12 and to couple with a free end 128 of cross brace 120. In one embodiment, each corner member 122 includes a first or bottom substantially planar section 140, a second or top substantially planar section 142, and sidewalls 144. In one example, each corner member 122 fits entirely within a footprint of the corresponding free end 128 of cross brace 120.

Figure 13:
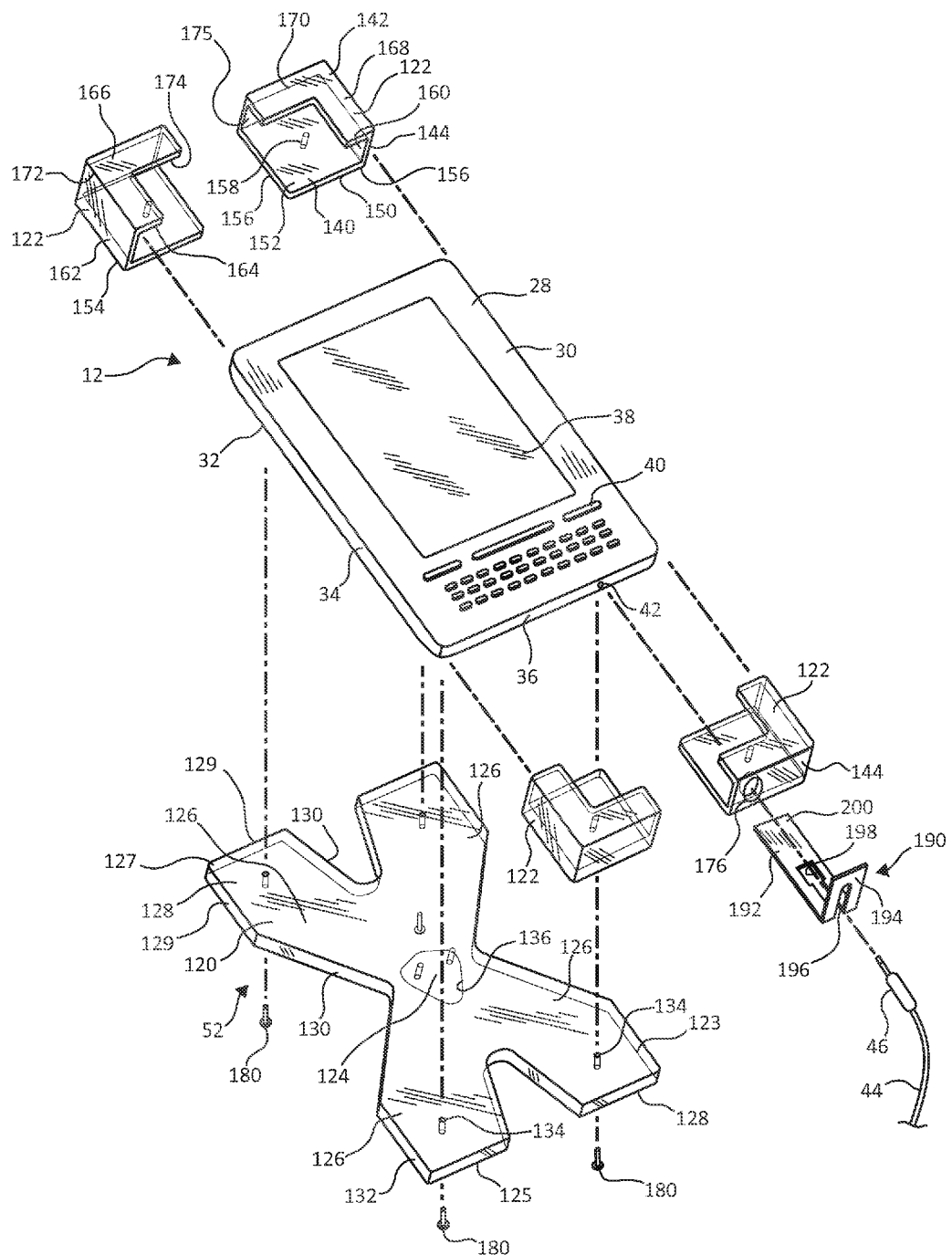
FIG. 13 is an exploded, top, front perspective view of the retaining assembly and the mobile electronic device of FIG. 5, according to one embodiment of the present invention.

Referring primarily to FIG. 13, bottom planar section 140 defines a bottom surface 150 opposite a top surface 152. In one embodiment, bottom surface 150 and top surface 152 are each substantially planar and/or are each substantially rectangular, for example, substantially square, in shape. Bottom planar section 140 defines two adjacent free edges 156 and two opposite adjacent closed edges 154.

Top substantially planar section 142 defines a bottom surface 164 opposite a top surface 166. In one embodiment, bottom surface 150 and top surface 152 are each substantially planar and are each substantially L-shaped defining a first linear segment 168 and a second linear segment 170 extending substantially perpendicularly to one another. Each linear segment 168 and 170 defines an external or closed edge 172 opposite an internal or free edge 174.

In one example, bottom substantially planar section 140 and top substantially planar section 142 are positioned to extend substantially parallel to one another and positioned such that closed edges 154 of bottom substantially planar section 140 align with closed edges 172 of top substantially planar section 142. In this configuration, linear segments 168 and 170 of top substantially planar member 140 have a width smaller than top substantially planar section 140 such that free edges 142 of top substantially planar section 140 are inset from free edges 156 of bottom substantially planar section 142. Each sidewall 144 is substantially linear and extends between one of closed edges 154 of bottom planar section 140 and one of closed edges 172 of top substantially planar section 142. Sidewalls 144 each extend substantially perpendicularly to top substantially planar section 140 and bottom substantially planar section 142 and abut one another along an intersection line or corner edge 178, which extends substantially perpendicularly to top substantially planar section 140 and bottom substantially planar section 142. Each sidewall 144 defines an interior surface 160 opposite an exterior surface 162 with interior surface 160 being immediately adjacent and defining a portion of a cavity 175 defined between bottom substantially planar surface 140 and top substantially planar surface 142.

Retaining assembly 52 is constructed by coupling four corner members 122 with cross brace 120. In one embodiment, cross brace 120 defines a preformed fastener aperture 134 through each free end 128 where each fastener aperture 134 is formed a similar distance away from the corresponding corner point 127 and linear edge segments 129 of the respective free end 128. Similarly, each corner member 122 defines a preformed fastener aperture 158 positioned at a consistent location from corner edge 178 or other edges of each respective corner member. The consistent location of fastener apertures 134 through cross brace 120 and fastener apertures 158 through corner members 122 allows the four corner members to be formed substantially identically such that four corners 122 can be interchangeably used one any one of the four free edges 128 of cross brace 120. In one embodiment, the consistent location of fastener apertures 134 and 158 continues through other sizes of cross brace 140 such that substantially identically formed corner members 122 can interchangeably be used on all available sizes of cross braces 140, where a particular size of cross brace 140 corresponds to the different sizes of e-readers and similar mobile electronic devices 12 to be displayed as part of display system 10 (FIG. 1).

Four corner members 122 are each placed in a different one of four free ends 128 of cross brace such that fastener apertures 134 and 158 align with one another, corner edge 178 of corner member 122 aligns with (in one example, is positioned directly adjacent to) corner point 127 of the respective free end 128, and exterior surface 163 of sidewalls 144 aligns with (in one example, is positioned directly adjacent to) the respective two linear edge segments 129 of cross brace 120. More particularly, bottom surfaces 150 of corner members 122 are positioned immediately adjacent top surface 123 of cross brace 120. In one embodiment, a portion of an outer perimeter of each corner member 12 extends substantially coextensively with a different portion of an outer perimeter of cross brace 120.

Fasteners 180 such as rivets, screws and washers, or any other suitable fastener(s) are secured to each extend through fastener apertures 134 and 158 of cross brace 120 and corresponding corner members 122. Fasteners 180, according to one embodiment, have a substantially low profile extension beyond cross brace 120 and corner members 122 so as to not significantly add to the overall thickness of assembled retainer assembly 52. Once assembled, cavities 175 of all corner members 122 are open toward one another and are each configured to receive a corner of housing 28 of a respective mobile electronic device 12. Notably, while primarily illustrated and described as including an X-shaped cross brace 120 with four corner members 122, other embodiments are contemplated, such as a Y-shaped cross brace with two corner members and an opposing edge member as will be apparent to those of ordinary skill in the art upon reading this application.

Either before or after corner members 122 are coupled with cross brace 120, cross brace 120 is coupled with coupling puck 88 of trunk assembly 50. More particularly, substantially planar surface 84 of coupling puck 88 is coupled to bottom surface 125 of cross brace 120, for example, using adhesives and/or suitable fasteners, such as fasteners 182. In one example, cross brace 120 includes one or both of preformed fastener apertures 138 and or an alignment line or indentation 136 shaped and sized similar to an outer perimeter of coupling puck 88 to facilitate placement of coupling puck 88 on cross brace 120. Fasteners 182 are thread through coupling puck 88 and fastener apertures 138 of cross brace 120 and secured to couple trunk assembly 50 to retaining assembly 52. Once so assembled and once trunk assembly 50 is placed relative to base unit 16 as pictured in FIG. 1 and described in additional detail below, coupling puck 88 is configured to selectively nest or otherwise be maintained in recess 80 resulting in retaining assembly 52 extending over cladding 60 such that, in one example, bottom surface 125 extends substantially parallel to at least a substantially planar portion of top surface 70 of cladding 60 as illustrated in FIG. 4.

Referring to FIG. 2, as will be further described below, retaining assembly 52 is constructed around a selected mobile electronic device 12 to be displayed as part of display system 10. First end plug 46 of power cord 44 is then inserted into power port 42 of mobile electronic device 12 and thread through front opening 106 in cladding 60 and front opening 92 in support unit 58 into cavity 78 and down into base unit 16. In one example, power cord 44 is a power charging or computer coupling cable or other cord provided with the particular mobile electronic device 12. In one embodiment, second end plug 48 of power cord 44 is inserted into a transformer or other converter unit 202, more particularly, a reception slot 204 of converter unit 202 configured to receive second end plug 48 of power cord 44, which in one embodiment, is a USB reception slot. Converter unit 202 further includes plug pins 206 for selective coupling with an alternating current outlet. In this manner, base unit 16 includes a plurality of alternating current outlets (not shown) configured to power each of the displayed mobile electronic devices 12 via corresponding converter units 202 and the respective power cord 44 for each mobile electronic device 12.

In one embodiment, a bracket 190 facilitates maintained coupling of first end plug 46 with power port 42 even during repeated handing of mobile electronic device 12 and display fixture 14 by consumers. Bracket 190 is substantially L-shaped to define a first or rearward extension segment 192 and a second or forward extension segment 194 substantially perpendicularly to rearward extension segment 192. An elongated slot 196 extends along longitudinally through a center of bracket 190 including through each of rearward extension segment 192 and forward extension segment 194. In one example, an enlarged portion 198 of elongated slot 196, that is a portion of elongated slot 196 having a greater lateral width than a remainder of elongated slot 196, is formed near an end of rearward extension segment 192.

During assembly, first end plug 46 of power cord 44 is thread through enlarged portion 198 of elongated slot 196 and inserted into power port 42. A top surface 200 of rearward extension segment 192 of bracket 190 is adhered or otherwise suitably coupled with bottom surface 125 of cross brace 120 such that a portion of elongated slot 196 defined by forward extension segment 194 aligns with power port 42 and receives power cord 44 extending away from first end plug 46. As such, bracket 190 protects power cord 44 from inadvertently being removed from mobile electronic device 12 during consumer inspection of mobile electronic device 12 included in display system 10. In other embodiments, bracket 190 is omitted.

Figure 14:
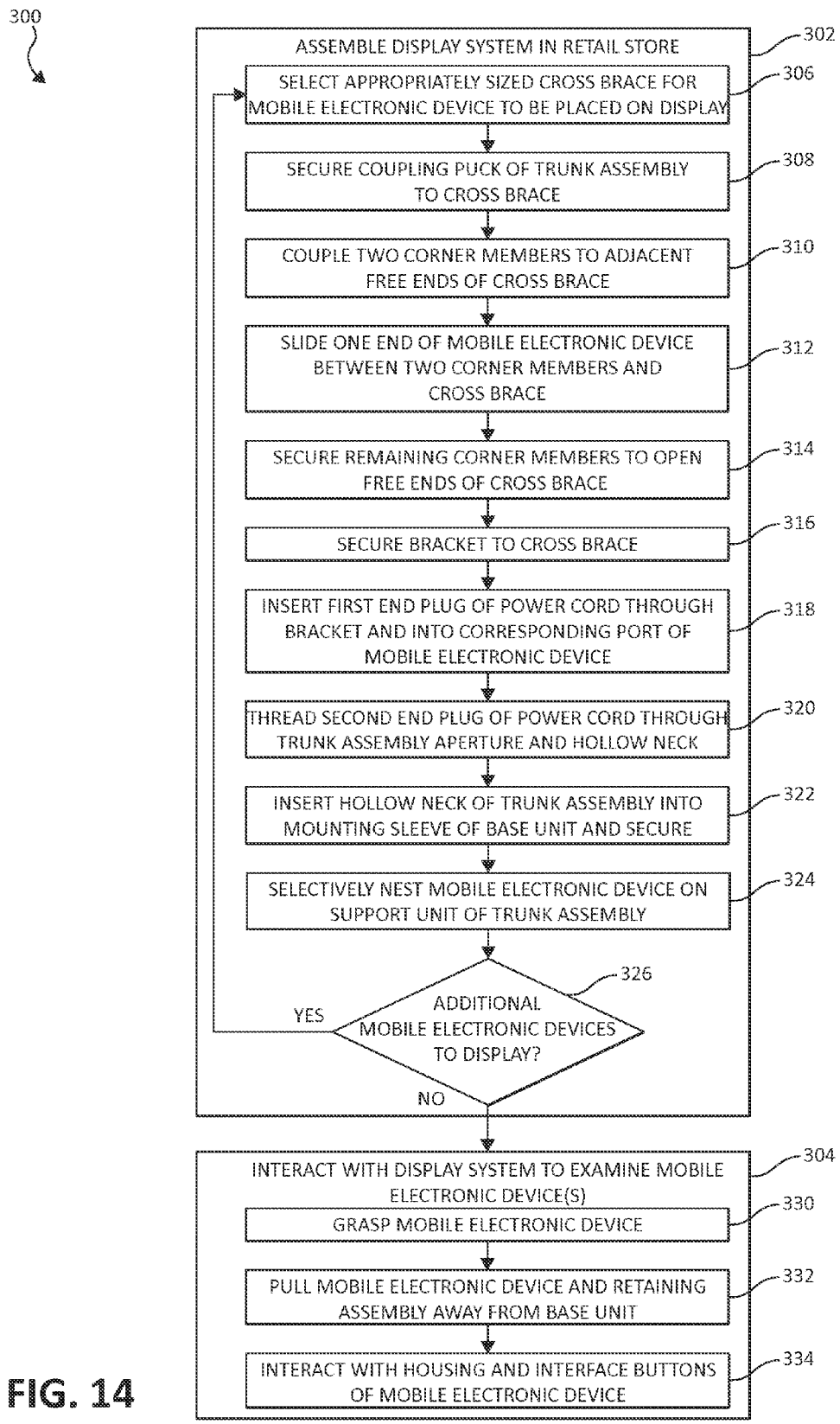
FIG. 14 is a flow chart of a method of assembling and interacting with a mobile electronic device, according to one embodiment of the present invention.

FIG. 14 illustrates a flow chart of a method 300 of constructing and using display system 10 including assembling display system 10 in a retail store or other retail setting 302 and consumer interaction with display system 10 to examine mobile electronic devices 12 at 304, accordingly to one embodiment of the present invention. Assembling display system 10 at 302 includes using the particular size of one of the mobile electronic devices 12 to be displayed to select a corresponding, similarly sized cross brace 120 at 306. More particularly, in one embodiment, an inventory of retaining assembly parts is provided including a number of each of a plurality of sizes of cross braces 120 and a number of identically sized corner members 122 for use in assembling retaining assemblies 52 for various sizes of mobile electronic devices 12. A cross brace 120 is selected having a footprint that is slightly larger than the mobile electronic device 12 it will be used to display. Since all corner members 122 are substantially identically sized, the number of different parts that need to be manufactured and/or stored is decreased, which is both economically and operationally efficient.

After selecting a cross member 120 of appropriate size corresponding to a selected one of mobile electronic devices 12 to be displayed at 306, at 308, coupling puck 88 is secured to bottom surface 125 of cross brace 120 via adhesive, fasteners 182, and/or other suitable device(s).

At 310, two corner members 122 are aligned with corresponding corner points 127 and two adjacent free ends 128 of cross brace 120 and are secured thereto, for example, with fasteners 180. At 312, the selected one of mobile electronic devices 12 is slid into cavities 175 of the two corner members 122 that are secured to cross brace 120. Once the selected mobile electronic device 12 is so positioned, two additional corner members 122 are secured to the remaining two adjacent free ends 128 of cross brace 120, for example, with fasteners 180, at 314. As such, each corner point 127 and corresponding linear edge segments 129 of all free ends 128 of cross brace 120 is secured to adjacent portions of a corresponding corner members 122, and all four corners of the selected mobile electronic device 12 are secured in a corresponding corner member 122.

In one example, at 316, one bracket 190 is secured to cross brace 120 at a position corresponding to a location of power port 42 through housing 28 of mobile electronic device 12, which as illustrated in FIG. 1 may vary per each one of mobile electronic devices 12 (e.g., off-center position of first end plug 46 relative to mobile electronic device 12*a* versus a substantially centered position of first end plug 46 relative to mobile electronic device 12*e*). In one embodiment, such as that illustrated in FIGS. 2 and 5-13, power port 42 of mobile electronic device 12 is positioned off-center such that one of sidewalls 144 of a corresponding corner member 142 extends over power port 42. In such an example, a hole 176 is drilled, initially molded, or otherwise formed through the respective corner member 122 to accommodate passage of first end plug 46 of power cord 44 to power port 42 of the respective mobile electronic device 12.

At 318, first end plug 46 of power cord 44, which may be sold with or offered as an accessory for end user used with mobile electronic device 12 being displayed, is thread through enlarged portion 198 of elongated slot 196 and into power port 42 of mobile electronic device 12. In one embodiment, depending, for example, on the configuration of bracket 190, operations 316 and 318 may be performed in an order opposite that illustrated in FIG. 14.

At 320, second plug end 48 of power cord 44 is thread through front opening 106 of cladding 60 and front opening 92 of support unit 58 into and through a hollow cavity (not shown) of mounting post 64 exiting at a bottom of mounting post 64, for example, as illustrated in FIG. 2. In another example, first plug end 46 is thread up through the hollow cavity of mounting post 64 through front opening 92 of support unit 58 and front opening 106 of cladding 60 before coupling first end plug to mobile electronic device 12 prior to performing operation 318. Similarly, depending upon the design particulars and/or preference, in one embodiment, other orders of performing operations 308, 310, 312, 314, 316, 318, and 320 are contemplated as will be apparent to those of ordinary skill in the art upon reading this application. In one embodiment, operations 306, 308, 310, 312, 314, 316, 318, and 320 are performed at a location remote from the retail store or end setting and the assembled display fixture 14 with mobile electronic device 12 are shipped to the retail store or end setting for performance of the remaining operations of method 300.

Referring to FIGS. 1 and 2 in combination, at 322, second end plug 48 is inserted through mounting sleeve 26 of base unit 16, and mounting post 64 is snuggly placed in mounting sleeve 26. Second end plug 48 is placed in communication with an alternating current outlet or similar outlet (not shown) within base unit 16, for example, via converter 202, as described above. Mounting post 64 is secured within mounting sleeve 26, for example, via thumbscrews extending through mounting sleeve 26 to interact with mounting post 64, pin 66, and/or via other suitable methods. Once mounting post 64 is secured within mounting sleeve 26, in one embodiment, a lower edge 110 of cladding is positioned adjacent and, in one example, in contact with, top display surface 22 of base unit 16 providing a clean and aesthetically pleasing appearance to display system 10. To complete construction and installation of display fixture 14 with mobile electronic device 12, at 324, coupling puck 88 coupled with retaining assembly 52 is selectively nested within recess 80 within protruding portion 76 of support unit 58 accessible via top opening 104 of cladding 60, for example, as illustrated in the side view of FIG. 4.

As illustrated, at 326, if additional mobile electronic display devices 12 are to be included in display system 10, operations 306, 308, 310, 312, 314, 316, 318, 320, 322, and 324 are repeated for the additional mobile electronic devices 12. Notably, while primarily described as being linearly performed for a single mobile electronic device 12 for illustrative purposes, portions of method 300 may be concurrently performed. For example, operations 306, 308, 310, 312, 314, 316, 318, and 320 are performed for all mobile electronic devices 12 to be included in display system 10, all resultant assemblies for all mobile electronic devices 12 are shipped to the retail store or other end setting to have each of operations 322 and 324 to be performed for all the mobile electronic devices 12.

After construction and installation of display fixtures 14 with corresponding mobile electronic mobile devices 12, consumer interaction with display system at 304 is permitted. For example, at 330, a consumer grasps one of displayed mobile electronic devices 12. Due to the substantial transparency of retaining assembly 52, the consumer is able to fully view each mobile electronic device 12. Due to cutouts 130 between arms 126 of cross brace 120, the consumer is additionally able to directly interact with and examine the thickness, finish, and general feel of the mobile electronic device 12. Still further, since only the very corner areas of top surface 30 of housing 28 of mobile electronic device 12 are covered, the consumer is able to directly view and interact with display screen 38 and interface buttons 40 without substantial interference from display fixture 14. Coupling display fixture 14 to trunk assembly 50 via retractable cable 82 also allows consumers to maneuver mobile electronic device 12 in a variety of manners to fully get a feel for how the mobile electronic device 12 feels and weighs in the consumers hands, thereby, allowing the consumer to make a decision regarding what mobile electronic device 12 he/she wishes to eventually purchase.

The display fixtures described herein provides aesthetically pleasing support for various brands, models, and sizes of mobile electronic and similar devices. As described and illustrated, a small number of inventoried piece types and sizes are used to form display fixtures suitable for the various brands, models, and sizes of mobile electronic devices. In addition, the display fixture can be largely constructed and secured to the selected mobile electronic devices for display prior to shipping the assembly to a retail store or end environment for installation with a base unit to form the end display system. As such, the retail store employee need only install the assembly with the base unit, which increases the likelihood of proper use of display fixture and consistent application of display fixtures to maintain mobile electronic device 12.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill in the art.

What is claimed is:

1. A display fixture for securely displaying a mobile electronic device in a retail setting, the display fixture comprising:
   a cross brace defining a center portion and including at least three arms radially extending outwardly from the center portion, wherein each of the at least three arms terminates in a free end opposite the center portion; and
   at least two corner members each including a first substantially planar wall, a second substantially planar wall extending substantially parallel to the first substantially planar wall, and two sidewalls extending between substantially linear closed edges of the first substantially planar wall and the second substantially planar wall, wherein:
   a cavity is defined by each of the at least two corner members between the first substantially planar wall and the second substantially planar wall and is configured to receive a corner of the mobile electronic device, each of the at least two corner members defines an opening to access the cavity of each of the at least two corner members opposite the two sidewalls, the second substantially planar wall of each of the at least two corner members is secured to a different free end of the cross brace such that the opening of each of the at least two corner members faces the center portion of the cross brace, and the cross brace is formed to have a greater length and width than the mobile electronic device, and the at least two corner members are each coupled to the cross brace such that one of the two sidewalls of each of the at least two corner members is coplanar with a different portion of an outer perimeter of the cross brace.

2. The display fixture of claim 1, wherein the cross brace is formed as a single-piece, substantially planar member.

3. The display fixture of claim 1, wherein the first substantially planar member of each of the at least two corner members is substantially L-shaped having two substantially linear segments extending substantially perpendicularly relative to one another.

4. The display fixture of claim 3, wherein for each of the at least two corner members:

each of the first substantially planar wall and the second substantially planar wall defines free edges opposite the substantially linear closed edges of the first substantially planar wall and the second substantially planar wall, the free edges at least partially form the opening to the cavity, and the free edges of the second substantially planar member extend farther away from the two sidewalls than the free edges of the first substantially planar member extend from the two sidewalls.

5. The display fixture of claim 1, wherein each of the least two corner members and the cross brace are formed as a single piece of material discrete from the others of the at least two corner members and the cross brace.

6. The display fixture of claim 5, wherein each of the cross brace and the at least two corner members are substantially transparent.

7. The display fixture of claim 1, wherein one of the at least three arms is positioned to define an obtuse angle between the one of the at least three arms and a second one of the at least three arms and to define an acute angle between the one of the at least three arms and a third one of the at least three arms.

8. The display fixture of claim 1, wherein:
the at least three arms are four arms,
the cross brace is substantially X-shaped,
the at least two corner members are four corner members, and
the second substantially planar wall of each of the four corner members is secured to the free end of a different one of the four arms.

9. The display fixture of claim 1, further comprising an L-shaped bracket coupled to the cross brace and including an extension segment extending substantially parallel to one of the two sidewalls of one of the at least two corner members, wherein the L-shaped bracket extends outwardly beyond a footprint of the cross brace such that the extension segment is spaced from the one of the two sidewalls to provide a protective area for receiving a power cord of the mobile electronic device between the one of the two sidewalls and the extension segment.

10. The display fixture of claim 1, further comprising a trunk assembly having a retractable cord and a coupling puck coupled to an end of the retractable cord, wherein the coupling puck is secured to a surface of the cross brace opposite the at least two corner members, and the cross brace is formed as a single substantially planar piece of material.

11. The display fixture of claim 10, wherein:
the trunk assembly includes a support unit and cladding,
the support unit includes the retractable cord and the coupling puck and is configured to be mounted to a base unit, and
the cladding is configured to substantially cover all portions of the support unit extending above the base unit.

12. The display fixture of claim 1, in combination with the mobile electronic device having a different corner thereof secured within the cavity of each of the at least two corner members.

13. The display fixture of claim 1, wherein the two sidewalls of each of the at least two corner members intersect one another opposite the opening to the access cavity of the corresponding one of the at least two corner members.

14. A display fixture for securely displaying a mobile electronic device in a retail setting, the display fixture comprising:
a cross brace defining a center portion and including at least three arms radially extending outwardly from the center portion, wherein each of the at least three arms terminates in a free end opposite the center portion; and
at least two corner members each including a first substantially planar wall, a second substantially planar wall extending substantially parallel to the first substantially planar wall, and two sidewalls extending between substantially linear closed edges of the first substantially planar wall and the second substantially planar wall, wherein:
a cavity is defined by each of the at least two corner members between the first substantially planar wall and the second substantially planar wall and is configured to receive a corner of the mobile electronic device,
each of the at least two corner members defines an opening to access the cavity of each of the at least two corner members opposite the two sidewalls,
the second substantially planar wall of each of the at least two corner members is secured to a different free end of the cross brace such that the opening of each of the at least two corner members faces the center portion of the cross brace, wherein:
each free end defines two linear edge segments intersecting to form a corner point of the cross brace,
the sidewalls of each of the at least two corner members include a laterally extending sidewall and a longitudinally extending side wall,
the laterally extending sidewall of one of the at least two corner members is positioned to be substantially coplanar with one of the two linear edge segments of a corresponding free end, and
the longitudinally extending sidewall of the one of the at least two corner members is positioned to be substantially coplanar with the other of the two linear edge segments of the corresponding free end.

15. A mounting fixture including:
a substantially planar X-shaped member defining four free ends;
a first corner member coupled to one of the four free ends and defining a first cavity closed along two linear segments of an outer perimeter of the one of the four free ends and open toward a second one of the four free ends opposite the one of the four free ends, wherein the first corner member fits entirely within the footprint of the one of the four free ends of the substantially planar X-shaped member; and a second corner member coupled to the second one of the four free ends and defining a second cavity closed along two linear segments of an outer perimeter of the second one of the four free ends and open toward the one of the four free ends, wherein the second corner member fits entirely within the footprint of the second one of the four free ends of the substantially planar X-shaped member such that a mobile device is configured to have opposite corners thereof maintained within the first cavity and the second cavity.

16. The mounting fixture of claim 15, wherein the first corner member includes a first substantially planar wall, a second substantially planar wall extending substantially parallel to the first substantially planar wall, and two intersecting sidewalls extending between substantially linear closed edges of the first substantially planar wall and the second substantially planar wall to define the first cavity between the first substantially planar wall and the second substantially planar wall.

17. The mounting fixture of claim 16, wherein each of the two intersecting sidewalls extends substantially coplanarly relative to a different one of the two linear segments of the outer perimeter of the one of the four free ends.

18. The mounting fixture of claim 15, wherein each of the first corner member and the second corner member is separately formed of a single piece of substantially transparent material.

19. The mounting fixture of claim 15, wherein the substantially planar X-shaped member includes four arms each extending from a center portion of the substantially planar X-shaped member to a different one of the four free ends, and each of the four arms extends at an obtuse angle relative to a first adjacent one of the four free ends and extends at an acute angle relative to a second adjacent one of the four free ends.

20. The mounting fixture of claim 15, in combination with a mobile electronic device maintained between the first corner member and the second corner member such that a footprint of the mobile electronic device has smaller lateral and longitudinal dimensions than the substantially planar X-shaped member.

21. The combination of claim 20, further comprising a support unit including a retractable cable having a first end coupled to the substantially planar X-shaped member.

22. A method of constructing a display fixture around a mobile electronic device, the method comprising:
providing a cross brace defining a center portion and including at least three arms radially extending outwardly from the center portion, wherein each of the at least three arms terminates in a free end opposite the center portion;
securing at least two corner members to a different free end of the cross brace, each of the at least two corner members including a first substantially planar wall, a second substantially planar wall extending substantially parallel to the first substantially planar wall, and two sidewalls extending between substantially linear closed edges of the first substantially planar wall and the second substantially planar wall, wherein:
a cavity is defined by each of the at least two corner members between the first substantially planar wall and the second substantially planar wall and is configured to receive a corner of the mobile electronic device,
each of the at least two corner members defines an opening to access the cavity of each of the at least two corner members opposite the two sidewalls facing the center portion of the cross brace, and
the two sidewalls of each of the at least two corner members intersect one another closing the cavity opposite the opening; and
placing each of two adjacent corners the mobile electronic device within the cavity defined a first one of the at least two corner members and the cavity defined by a second one of the at least two corner members such that each of the two adjacent corners of the mobile electronic device are covered by a different one of the at least two corner members of the display fixture.

23. The method of claim 22, further comprising securing a third corner member to the free end of the cross brace not secured to either of the first one or the second one of the at least two corner members to receive a third corner of the mobile electronic device in a manner tightly securing the mobile electronic device to the cross brace via the at least two corner members and the third corner member.

* * * * *